Figure 1:
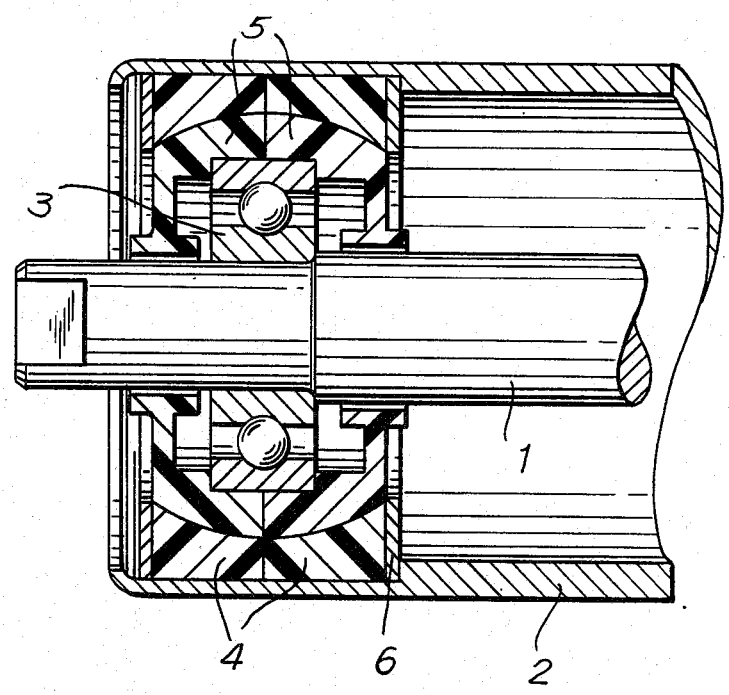

United States Patent [19]

Égetö et al.

[11] Patent Number: 4,668,110
[45] Date of Patent: May 26, 1987

[54] ANTIFRICTION BEARING BLOCK ESPECIALLY FOR BEARING SUPPORT OF ROLLERS OF BELT CONVEYOR

[75] Inventors: Csaba Égetö, Budapest; Zoltán Szalay, Tatabánya; Béla Dörömbösy, Tatabánya; Károly Krauz, Tatabánya, all of Hungary

[73] Assignee: Nikex Nehezipari Kulkereskedelmi, Budapest, Hungary

[21] Appl. No.: 634,415

[22] Filed: Jul. 25, 1984

[30] Foreign Application Priority Data

Oct. 3, 1983 [HU] Hungary ............................ 3427/83

[51] Int. Cl.$^4$ ................. F16C 27/06; F16C 23/08; B05G 13/00
[52] U.S. Cl. .................................. 384/536; 193/37; 384/498
[58] Field of Search ............... 384/495, 496, 497, 498, 384/535, 536, 537, 543, 418, 419; 193/37

[56] References Cited

U.S. PATENT DOCUMENTS

| | | | |
|---|---|---|---|
| 2,572,411 | 10/1951 | Watt | 384/536 |
| 2,886,156 | 5/1959 | Halbron | 193/37 |
| 3,224,821 | 12/1965 | Barr | 384/498 X |
| 3,301,612 | 1/1967 | Thomas | 384/536 |
| 4,025,135 | 5/1977 | Hishida | 384/498 |
| 4,339,158 | 7/1982 | Greener | 193/37 X |

FOREIGN PATENT DOCUMENTS

| | | | |
|---|---|---|---|
| 1208000 | 9/1959 | France | 193/37 |
| 688392 | 12/1979 | U.S.S.R. | 193/37 |

Primary Examiner—Stuart S. Levy
Assistant Examiner—Thomas R. Hannon
Attorney, Agent, or Firm—Mandeville and Schweitzer

[57] ABSTRACT

According to the invention, an inexpensive antifriction bearing is located in a plastic block and the plastic block is encircled by a further plastic ring. The softening point of the plastic ring is lower by 20° C. than that of the material of the bearing block and between the softening point and melting point of the ring a difference of at least 30° C. exists ensuring that in case of excessive warming up of the bearing, the sliding on each other of the plastic block and of the outer plastic ring as plain bearing, puts the bearing out of action for a certain time. The contact surfaces of the bearing block and the ring are spherical, ensuring the compensation of possible eccentricity by self-aligning. The ring is fixed in the seat of a roller by flanging. The invention renders superfluous the otherwise indispensable high-precision single-purpose machine or horizontal lathe for boring the roller, and makes possible the application of the technology of mass production.

7 Claims, 1 Drawing Figure

ANTIFRICTION BEARING BLOCK ESPECIALLY FOR BEARING SUPPORT OF ROLLERS OF BELT CONVEYOR

The service life of the antifriction bearing is determined by several factors as emphasized in the introduction of all technical books on bearing support. An important factor being the subject of the invention is the accuracy of the synchronous running of the inner and outer rings of the anti-friction bearing, i.e. the uniaxiality of cylindrical seats carrying the inner and outer bearing rings.

It is well known that in several cases the uniaxial running of the cylindrical surfaces supporting the outer and inner bearing rings cannot be ensured for structural or technological reasons, so much so that for such purposes the bearing catalogues contain such bearing series which, against a small reduction of loadibility, provide for the possibility of axial divergence to a certain extent for the outer and inner rings; the bearings compensating the axial divergence of larger extent are, generally known, the highly expensive self-aligning bearings. These bearings i.e. these bearing types have been designed, of course, with compromises of various magnitude and nature; thus, the service life, the dimension and the price of the bearing paid considerably for the novel ability.

The specialists agree in that these latter bearings - although they endure the axial divergence between the two bearing rings without seizure, and break, respectively, cannot be taken into consideration in the mass production since the framework of the mass producing industry determines, i.e. limits the maximum price of a structural element used in large number. Such a field is e.g. the production of belt conveyors where the number of the belt carrying rollers is high, at the same time, and just therefore, the highly precise machine-tool of relatively, low productivity (e.g. a horizontal lathe) to be found in factories working with high schedule of overhead expenses (e.g. in passanger car and lorry factories, machine-tool factory, aircraft factory) cannot be taken into consideration for machining the bearing housings of the rollers. The factories producing building constructions or other steel constructions and working with low schedule of overhead expenses keep away from machining and if this is unavoidable, they carry out the machining normally on inexpensive lathes, since the purchase of a precise single-purpose machine of low productivity—having a price of 2-3 million forint—exceeds their development capacity. Consequently, the uniaxiality of bearing-carrying surfaces of rollers is only an endeavour i.e. an unattainable goal. The required minimum service life of the belt conveyors marketable on international markets and that of each roller amounts to 22.000 working hours, but a service life of 40.000 hours is also known (according to an English folder). The service life of the home-produced belt conveyors range to about 10.000 working hours. This value is low even if they are produced only for the home market since the renewal costs, the costs of maintenance and thus the operating costs are in inverse ratio to the service life, therefore the operation of the home-produced belt conveyors is imaginable only at higher cost and in addition, the production of spare parts excessively burdens the home production capacity being already restricted. The invention relates also to the fact that at a possible warming up of the antifriction bearing fires may break out on the belt causing extremely great damage and risk of accident.

The invention aims at the elimination of the above described drawbacks and this way successfully done as evidenced by the preliminary operation. The set aim was achieved by the expedient shaping of the block enclosing the antifriction bearing, and in compliance therewith, the invention is: antifriction bearing block, especially for bearing support of the rollers of belt conveyor, characterized in that the bearing block is made of synthetic resin (plastic material) and its outer (end) surface is a spherical surface, further the ring filling out the space between the bearing block and the roller to be supported in bearing is made similarly of synthetic resin (plastic material), the material of which has a softening point lower by at least 20° C. than the material of the bearing block and between its softening point and melting point a difference of at least 30° C. exists, as well as its surface contacting the bearing block is also a (negative) spherical surface and the antifriction bearing is split in plane defined by the contact of its rolling bodies and the outer bearing ring and finally, the ring is fixed by flanging in the seat developed for this purpose of the roller by means of thrust rings.

The aim of the solution defined in the claim is among others the achievement of six effects:

1. the outer ring of the antifriction bearing is flexibly fixed in the bearing block, therefore it may be prestressed to the required extent, 2. the possible axial divergence of the seating surface of revolution of the bearing is flexibly compensated by annihilation of energy, 3. in case of warming up of the bearing for whatever reason the ring made e.g. of PVC—the softening point of which is 80° C.—softens and the compensation of periodic forces caused by the axial divergence is combined with more considerable annihilation of energy, 4. in extreme case, the ring made e.g. of PVC—the melting point of which is 150° C.—looses gradually its solid state at the above temperature, as a consequence of which the prestress set between the bearing block and the outer bearing ring releases and for a short time the spherical surface of the bearing block and the spherical surface of the outer bearing ring sliding on each other fill a part of plain-bearing character; it should be, however, stressed that this state takes only a short time and rates as emergency operation, 5. the prolongation by 100–200 percent of the service life i.e. working hours of the rollers, as compared to the service life of home-produced rollers, 6. and finally, provision for the productability of bearing supports of rollers by mass-production technology.

The structure, operation mechanism and the advantages of the invention as compared to the traditional antifriction bearing blocks will be outlined by means of the schematic drawing of an embodiment shown by way of example.

As compared to the traditional form of the already known plastic bearing blocks, the bearing block according to the invention differs with respect to the two kinds of plastic material of different mechanical properties used for the construction, as well as to the bearing block and to the ring encasing the block, further as regards the spherical fit of the bearing block and the ring embracing the block and the fact that the ring embracing the block is fixed by flanging in the inside of the roller in a seat developed for this purpose. The above aims are achieved by the invention so that an inexpensive single-row deep-groove bearing is arranged on the axle and then, this bearing is provided with a plastic bearing block consisting of two halves in such a manner that this bearing block is pushed onto the antifriction bearing from two sides. The block is provided with suitable grease holder ensuring the lubrication of the bearing. The outer surface of the block is spherical and on this spherical outer surface, similarly from two sides, an outer, split plastic ring is fitted the inner surface of which is similarly spherical and seats on the bearing block. The bearing equipped in this way is pressed in the suitably developed seat of the roller while the outer ring is encircled from two sides by one metal thrust ring each and the assembly unit pressed in in this way is fixed again by pressing, folding the abutting collar of the roller and at the same time, the plastic ring and the block are suitably prestressed.

The solution according to the invention will be described in details by means of a concrete embodiment according to FIG. 1.

In case of the embodiment according to FIG. 1, after being pressed on the axle 1, the plastic bearing block 5 consisting of two halves is pushed on the antifriction bearing 3, then, similarly from two sides, the plastic ring 4 consisting also of two halves is fitted on the bearing block and, after having supported one of the two thrust rings 6 suitable for encircling the plastic ring on the bottom of the bearing housing of the roller 2, the assembly unit developed in this way is pressed into the said cylindrical seat of the roller 2, then, the other thrust ring 6 is fitted to the plastic ring 4 and the abutting collar of the roller 2 is pressed onto the thrust ring 6 at a force corresponding to the required prestress.

As for the used materials, it should be noted that e.g. the PVC material acts in certain respect and to a certain extent like the water, i.e. by pressure it cannot be forced to change its volume but can be forced to change its form, as a consequence of which it is remarkably suitable for the compensation of inaccuracies of bearing support resulting from the technology, with other words, for the tolerance and absorption of forces of varying direction and thus, it promotes the considerable extension of the service life of antifriction bearing (saving operation), at the same time, in case of the overheating for whatever reason of the bearing, or of the deterioration of its rolling properties (which is accompanied, of course, by the increase of the running temperature) i.e. above 80° C. a further material characteristic of PVC is utilized, namely that above the said temperature the PVC approaches more considerably the state characteristic of the liquids, i.e. under the effect of the pressure it tries to fill out the available place with lower resistance even if the form of this space periodically varies during the revolution of the roller, while the volume remains constant (e.g. in case of not uniaxial bearing support), the energy annihilating capacity of the bearing block increases therefore to a considerable extent; in case of further temperature rise, however, i.e. above 150° C. the ring becomes a fusion, or, more precisely, a pasty mass and partly issues from the seat, consequently the force (moment) turning the outer ring of the anti-friction bearing ceases and up to reaching a certain temperature (for a short time) the mechanism operates as a plain bearing. Due to these properties, in the mechanism according to the invention the most inexpensive antifriction bearing can be used.

By reason of the aforesaid, it is perhaps unnecessary to prove the complex effect attainable by the mechanism according to the invention as against the already known solutions, namely the regulating effect of the plastic bearing block built up according to the invention; if the working temperature of the bearing raises due to insufficient lubrication or erroneous prestress or even due to the access of solid particles to the bearing space, the detrimental stress acting on the antifriction bearing reduces proportionally to the excess heat (even in case of not uniaxial bearing support), further in case of breakdowns causing possible overload, if they do not belong to the heat sources inducing premanent damage, the bearing block together with the PVC ring adjusts the load to be tolerated by the antrifriction bearing to the value corresponding to the operation; moreover, above a given limit it fully disengages the bearing. The solution according to the invention ensures another considerable advantage: the necessary quantity of rollers to be produced as spare part approaches essentially the available production capacity when applying the solution according to the invention, moreover, the high-mass production on the available machines is possible without any investment since the solution requires only pressed components. Finally, the longer service life attainable with the solution brings nearer the endurance parameters of the product to the international standards while the manufacturing cost and thus the market price of the product is lower than the price of the known rollers, consequently it is competitive also in international relation.

It should be emphasized that the figure as well as the solution introduced as concrete embodiment are shown only by way of example for illustrating the invention and do not underlie the definition of the claimed scope of protection for which the claim serves, as e.g. in the description the material of the thrust ring was considered PVC for the sake of the example and of the determination of a concrete embodiment, whereas for this purpose all plastic material is suitable the softening point of which is lower by at least 20° C. than the softening point of the bearing block, further between the softening point and melting point of the ring a difference of at least 30° C. exists; several such materials are to be found today and, in all likelihood, numerous new ones will be developed in the future, therefore it would be unjustified and inequitable to limit the claim to such a material which is not subject of the invention; it is generally known that several plastic materials having such properties are to be found on the market.

What we claim is:

1. Antifriction bearing device, comprising a bearing block (5) comprised of synthetic resin, an outer surface of said bearing block being a spherical surface, an outer bearing ring (4) for filling out space between the bearing block (5) and an object (2) to be supported by the bearing, said outer bearing ring comprising a synthetic resin having a softening point lower by at least 20° C. than the material of the bearing block (5) and there being between the softening point and melting point of said outer bearing ring a difference of at least 30° C., the surface of said outer bearing ring contacting the bearing block (5) being a negative spherical surface, the antifriction bearing (3) defining a plane defined by contact of its rolling bodies on its races, the bearing block (5) and outer bearing ring (4) being split along said plane and thrust rings (6) for fixing the outer bearing rings (4) in a seat of an object to be supported.

2. The antifriction bearing device of claim 1 wherein the synthetic resin of the bearing block is a plastic material.

3. The antifriction bearing device of claim 1 wherein the synthetic resin of the outer bearing ring is a plastic material.

4. The antifriction bearing device of claim 1, wherein
(a) the object to be supported is a roller,
(b) the outer bearing ring fills out a space between the bearing block and the roller and
(c) the thrust rings fix the outer bearing ring in the seat of the roller.

5. Roller of a belt conveyor supported by the antifriction bearing device of claim 4.

6. The antifriction bearing device of claim 4, wherein the roller is a roller of a belt conveyor.

7. The antifriction bearing device of claim 1 wherein the outer bearing ring comprises PVC.

* * * * *